(12) United States Patent
Hong et al.

(10) Patent No.: US 9,532,306 B2
(45) Date of Patent: *Dec. 27, 2016

(54) INTERNET PROTOCOL-BASED SLEEP MODE CONTROL METHOD

(71) Applicant: ELECTRONICS AND TELECOMMUNICATIONS RESEARCH INSTITUTE, Daejeon (KR)

(72) Inventors: Yonggeun Hong, Daejeon (KR); Myungki Shin, Seoul (KR); Hyoungjun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 197 days.

This patent is subject to a terminal disclaimer.

(21) Appl. No.: 14/464,880

(22) Filed: Aug. 21, 2014

(65) Prior Publication Data
US 2015/0103712 A1   Apr. 16, 2015

(30) Foreign Application Priority Data
Oct. 10, 2013   (KR) .......................... 10-2013-0120549

(51) Int. Cl.
*H04W 52/02*   (2009.01)

(52) U.S. Cl.
CPC ................................ *H04W 52/0203* (2013.01)

(58) Field of Classification Search
None
See application file for complete search history.

(56) References Cited

U.S. PATENT DOCUMENTS

| 9,226,229 | B2 * | 12/2015 | Hong | ..................... | H04W 40/10 |
| 2005/0070340 | A1 * | 3/2005 | Kim | .................. | H04W 52/0216 |
| | | | | | 455/574 |
| 2012/0188925 | A1 | 7/2012 | Lee et al. | | |

FOREIGN PATENT DOCUMENTS

| KR | 10-2012-0072331 | 7/2012 |
| KR | 10-1241677 | 3/2013 |
| KR | 10-2013-0041969 | 4/2013 |
| WO | 2012/013215 | 2/2012 |

\* cited by examiner

*Primary Examiner* — Kevin C Harper
*Assistant Examiner* — Derrick V Rose
(74) *Attorney, Agent, or Firm* — Kile Park Reed & Houtteman PLLC (57) ABSTRACT

A method for Internet Protocol (IP)-based sleep mode control is disclosed. The method includes, when a request for a sleep mode is made from any one of internal hosts, transmitting a sleep mode request message to an internal router, updating the state of the corresponding host to a sleep mode, transmitting a sleep mode ACK message to the internal host requiring a sleep mode, switching to a sleep mode, and transmitting information about the internal hosts in a sleep mode to the external hosts of a history information list because the internal router stores the history information of the external hosts that communicated with the internal hosts in a sleep mode in the form of a list.

8 Claims, 11 Drawing Sheets

(RELATED ART)

INTERNET PROTOCOL-BASED SLEEP MODE CONTROL METHOD

CROSS-REFERENCE TO RELATED APPLICATION

This application claims the benefit of Korean Patent Application No. 10-2013-0120549, filed Oct. 10, 2013, which is hereby incorporated by reference herein in its entirety.

BACKGROUND OF THE INVENTION

1. Technical Field

The present disclosure relates generally to an Internet Protocol (IP)-based sleep mode control method and, more particularly, to technology that performs processing in the case where a request for a sleep mode is made from any one of one or more internal hosts, in the case where the internal hosts of a sleep mode control network are collectively required to enter a sleep mode in response to a request from an internal router, or in the case where a request for data communication with the internal hosts in a sleep mode is made from an external router, in a network including the sleep mode control network including the internal hosts and the internal router responsible for the communication of the internal hosts, and also including the external router connected to the sleep mode control network and IP-based external hosts connected via the external router.

2. Description of the Related Art

Figure 1:
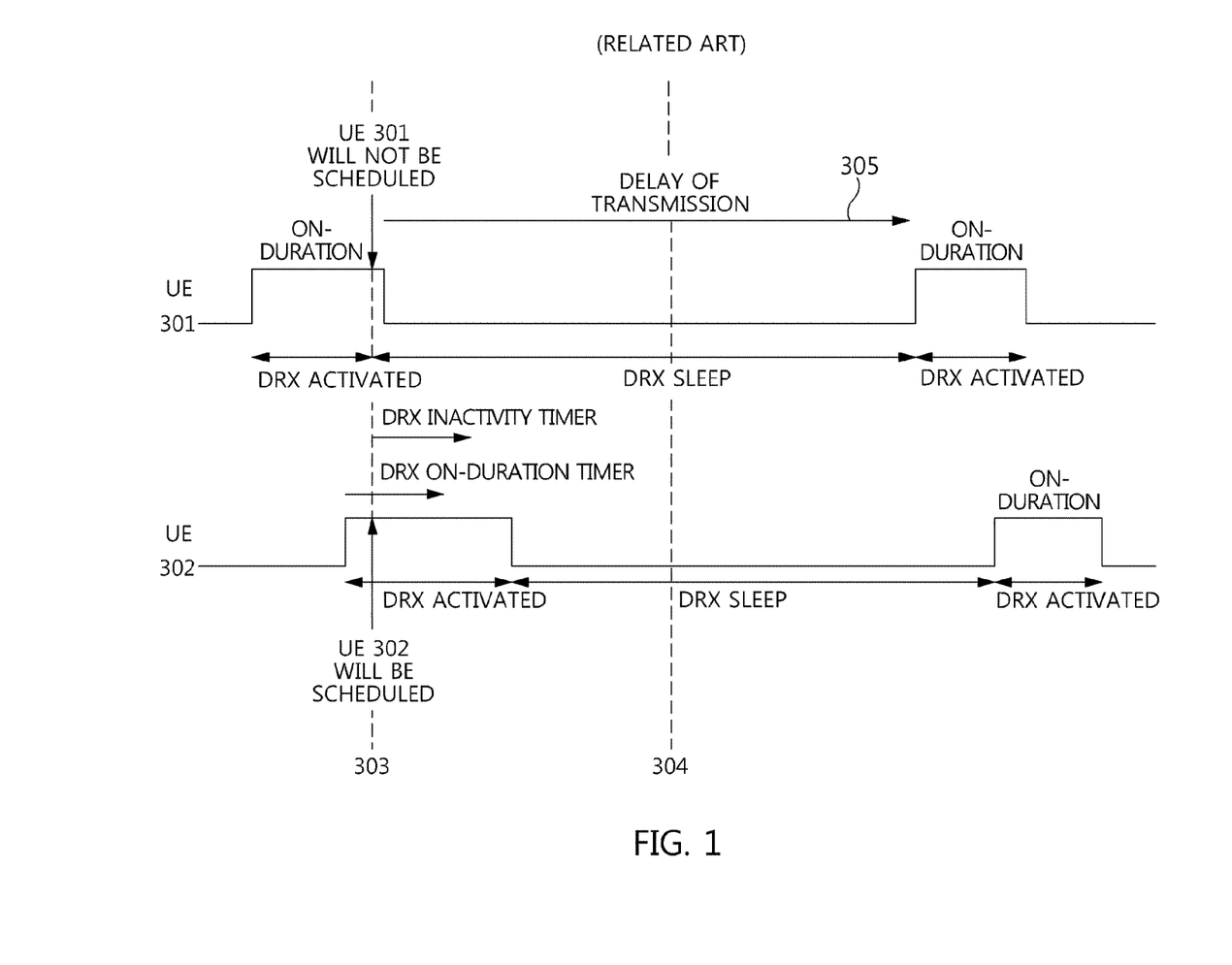
FIG. 1 is a diagram illustrating the configuration of a method and device for data processing within a communication network as a related technology.

As a related technology, Korean Patent Application Publication No. 10-2013-0041969A discloses a method and device for data processing within a communication network, which is illustrated in FIG. 1. This technology is designed to assign scheduling priority based on the period it takes for a terminal to enter a sleep mode, and is characterized in that it is configured such that scheduling priority is assigned by the base station of a wireless access network.

Figure 2:
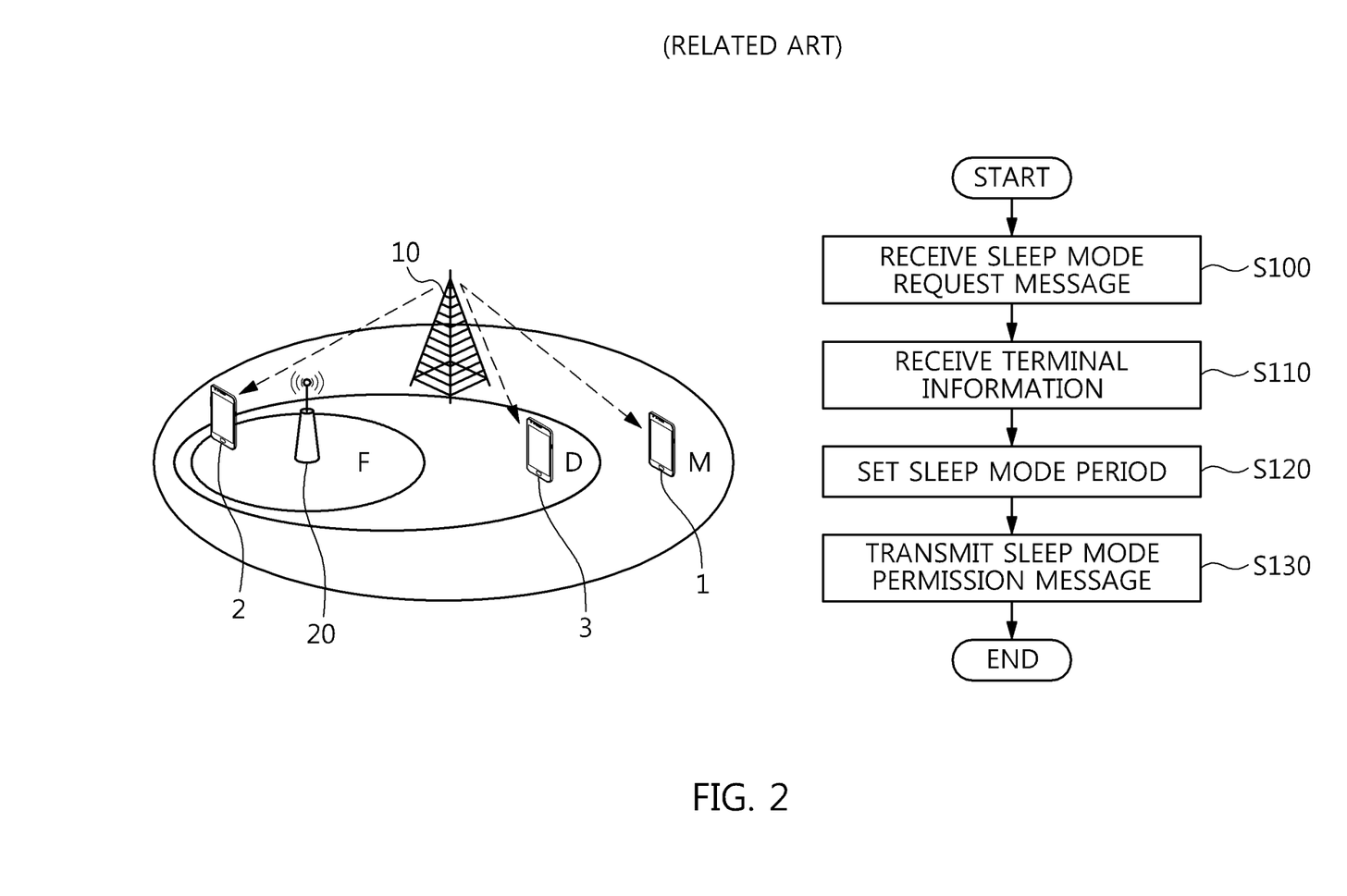
FIG. 2 is a diagram illustrating the configuration of a method and apparatus for setting the sleep mode of a femto base station as another related technology.

As another related technology, Korean Patent No. 10-1241677B1 discloses a method and apparatus for setting the sleep mode of a femto base station, which is illustrated in FIG. 2. This technology relates to a method and apparatus for setting the sleep mode of a femto base station, which adaptively set the sleep mode period of a femto base station based on the location and state of a terminal using a femto base station in a wireless communication system, thereby reducing the power consumption of the femto base station and also supporting smooth handoff when the terminal enters the coverage of the femto base station. The method for setting the sleep mode of a femto base station includes receiving a sleep request message from a femto base station, receiving terminal information within its service area, setting the sleep mode period of the femto base station using the sleep mode request message and the terminal information, and transmitting a sleep mode permission message including the set sleep mode period to the femto base station.

Figure 3:
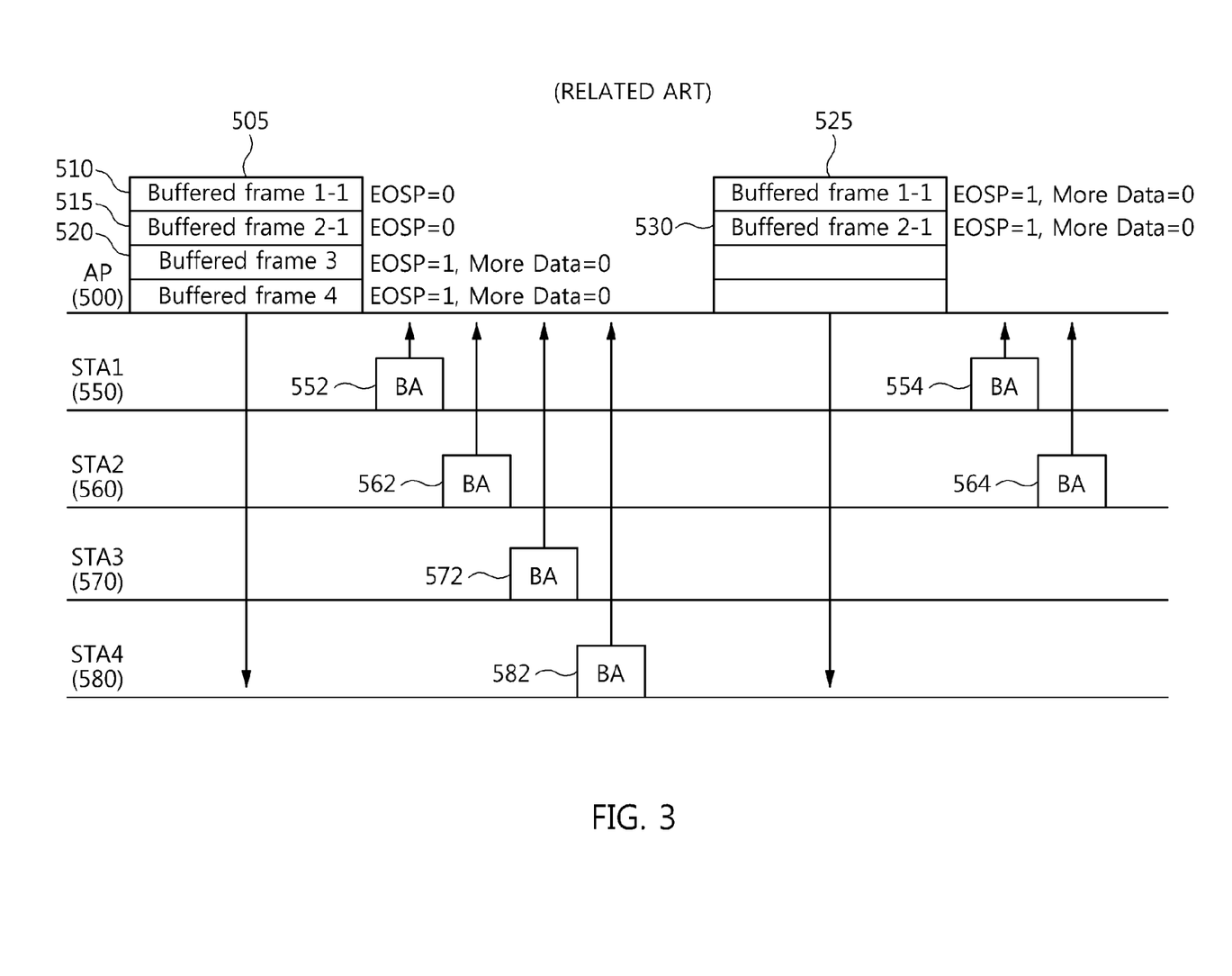
FIG. 3 is a diagram illustrating the configuration of an apparatus and method for the transmission and reception of data in a communication system as still another related technology.

As still another technology, Korean Patent Application Publication No. 10-2012-0072331A discloses an apparatus and method for the transmission and reception of data in a communication system, which is illustrated in FIG. 3. This technology relates to an apparatus and method that transmit and receive data while providing efficient power saving in a terminal, for example, a station STA, in a communication system for providing service to multiple users using a Multi-Input Multi-Output (MIMO) method. This technology is configured to receive uplink frames from a plurality of terminals using a MIMO method, to generate a packet including information about the support of an automatic power save delivery (APSD) method that controls the state transition between the sleep and wake-up modes of the terminals, to buffer data corresponding to the terminals, and to transmit downlink frames including the generated packet and the buffered data to the terminals using a MIMO method.

SUMMARY OF THE INVENTION

Accordingly, at least one embodiment of the present invention is intended to provide technology that performs processing in the case where a request for a sleep mode is made from any one of one or more internal hosts, in the case where the internal hosts of a sleep mode control network are collectively required to enter a sleep mode in response to a request from an internal router, or in the case where a request for data communication with the internal hosts in a sleep mode is made from an external router, in a network including the sleep mode control network including the internal hosts and the internal router responsible for the communication of the internal hosts, and also including the external router connected to the internal router responsible for the communication of the sleep mode control network and IP-based external hosts connected via the external router.

In accordance with an aspect of the present invention, there is provided a method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method including, when a request for a sleep mode is made from any one of the internal hosts, transmitting, by one of the internal hosts requiring a sleep mode, a sleep mode request message to the internal router; updating, by the internal router having received the sleep mode request message from the internal host requiring a sleep mode, a state of the corresponding host to a sleep mode; transmitting, by the internal router, a sleep mode ACK message to the internal host requiring a sleep mode; switching, by the internal host having received the sleep mode ACK message from the internal router, to a sleep mode; and transmitting, by the internal router, information about the internal hosts in a sleep mode to external hosts of a history information list because the internal router stores history information of the external hosts that communicated with the internal hosts in a sleep mode in a list form.

Transmitting the sleep mode request message to the internal router may include transmitting, by the internal host requiring a sleep mode, wake-up time information, together with the sleep mode request message.

Transmitting the information about the internal hosts in a sleep mode may include providing, by the internal router, wake-up time information to the external hosts of the history information list, thereby enabling external hosts that communicated with the internal hosts in a sleep mode to make a communication re-attempt.

In accordance with another aspect of the present invention, there is provided a method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method including, when a sleep mode is required from the internal router, transmitting, by the internal router, a sleep mode start and end time message indicative of start and end times of a sleep mode to the internal hosts; switching, by the internal hosts having received the sleep mode start and end time message from the internal router, to a sleep mode, and updating, by the internal hosts having received the sleep mode start and end time message from the internal router, a state of the internal hosts to a sleep mode; and transmitting, by the internal router, information about the internal hosts in a sleep mode to the external hosts of a history information list because the internal router stores the history information of the external hosts that communicated with the internal hosts in a sleep mode in a list form.

Transmitting the information about the internal hosts in a sleep mode may include further providing, by the internal router, information about an end time of the sleep mode to the external hosts of the history information list, thereby enabling the external hosts that communicated with the internal hosts in a sleep mode to make a communication re-attempt later.

In accordance with still another aspect of the present invention, there is provided a method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method including, when a communication attempt is made from an external network with the network set to a sleep mode, transmitting a packet to the internal router from the external hosts through the external router with one or more internal hosts set to a sleep mode on the sleep mode control network; referring, by the internal router, to a list of internal hosts currently in a sleep mode within the sleep mode control network; and, when a destination host of the packet is in a sleep mode, transmitting a message indicative that the destination host is in a sleep mode to the external hosts that have transmitted the packet via the external router.

Transmitting the message indicative that the destination host is in a sleep mode may include, when sleep mode end time information of the destination host of the packet is provided to the internal router, transmitting, by the internal router, a message including the sleep mode end time information to the external hosts, thereby enabling the external hosts to make a communication re-attempt.

Transmitting the message indicative that the destination host is in a sleep mode may include transferring, by the external host having received the message including the sleep mode end time information of the destination host, the sleep mode end time information of the destination host from a network layer to a transport layer and an application layer using a cross layer method, thereby enabling a communication re-attempt to be made later.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The following description merely illustrates the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements reciting principles, aspects, and embodiments of the invention, as well as specific examples thereof, are intended to encompass structural and functional equivalents thereof.

The above-described objects, features and advantages will be more apparent from the following detailed description when taken in conjunction with the accompanying drawings. In the following description of the present invention, detailed descriptions of well-known functions and configurations which are deemed to make the gist of the present invention obscure will be omitted.

Embodiments of the present invention will be described in detail below with reference to the accompanying drawings.

Figure 4:
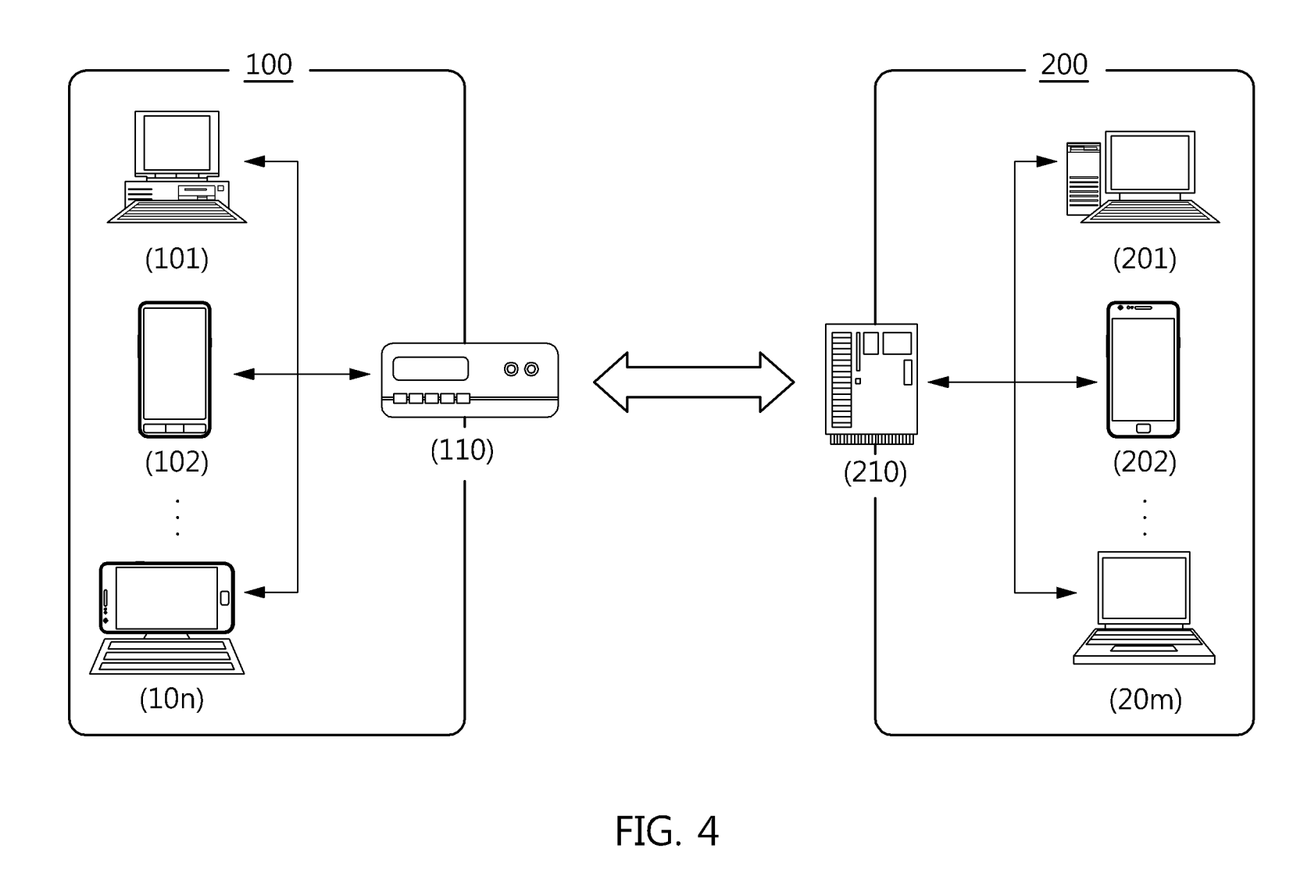
FIG. 4 illustrates an example of a network configuration for IP-based sleep mode control according to an embodiment of the present invention.

FIG. 4 illustrates an example of a network configuration for IP-based sleep mode control according to an embodiment of the present invention. The network configuration according to this embodiment of the present invention includes a sleep mode control network 100 including one or more internal hosts 101 to 10n and an internal router 110 responsible for the communication of the internal hosts 101 to 10n, and also includes an external router 210 connected to the internal router 110 responsible for the communication of the sleep mode control network 100, and IP-based external hosts 200 to 20n connected via an external network 200 including the external router 210.

Figure 5:
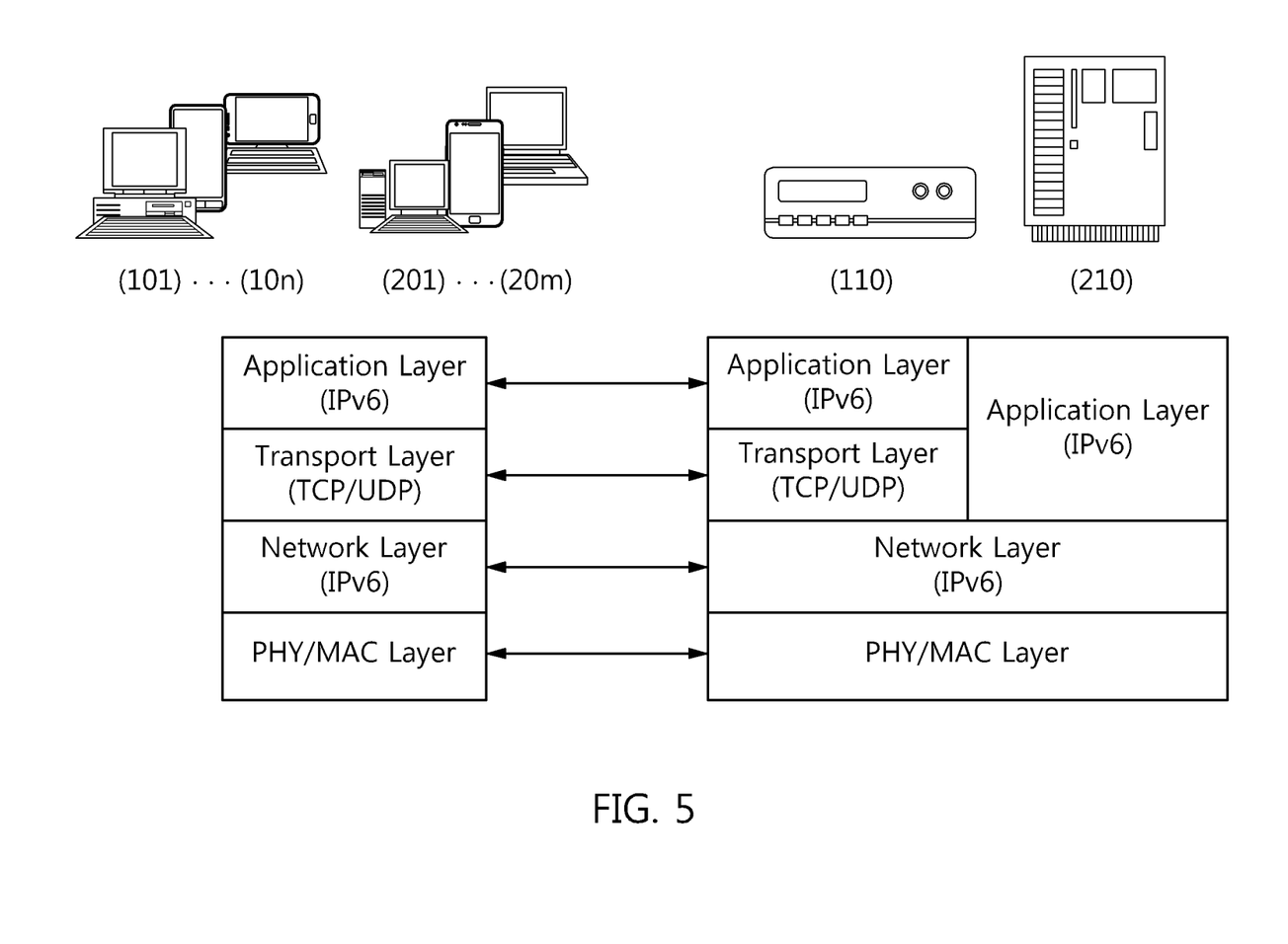
FIG. 5 illustrates an example of the protocol relationships of a network for IP-based sleep mode control according to an embodiment of the present invention.

FIG. 5 illustrates an example of the protocol relationships among the internal hosts 101 to 10n, internal router 110, the external router 210, and the external hosts 201 to 20n on the IP-based sleep mode control network according to this embodiment of the present invention. Each of the internal router 110 and the external router 210 forms a PHY/MAC layer, a network layer, a transport layer, and an application layer in order to communicate with the internal hosts 101 to 10n or external hosts 201 to 20n. Each of the internal router 110 and the external router 210 communicates with the internal hosts 100 to 10n or external hosts 201 to 20n while converting data packets using IP IDs.

Although IP is used in a general TCP/IP protocol-based network layer, it is also used in an application layer. In the network according to this embodiment of the present invention, different PHY/MAC layer IDs may be used by adding the network layer to the PHY/MAC layer and performing a cooperative operation in the network layer using an IP ID. Furthermore, the PHY/MAC layer and the network layer may be used in the same forms as the general PHY/MAC layer and the general network layer, or in simplified forms.

Figure 6:
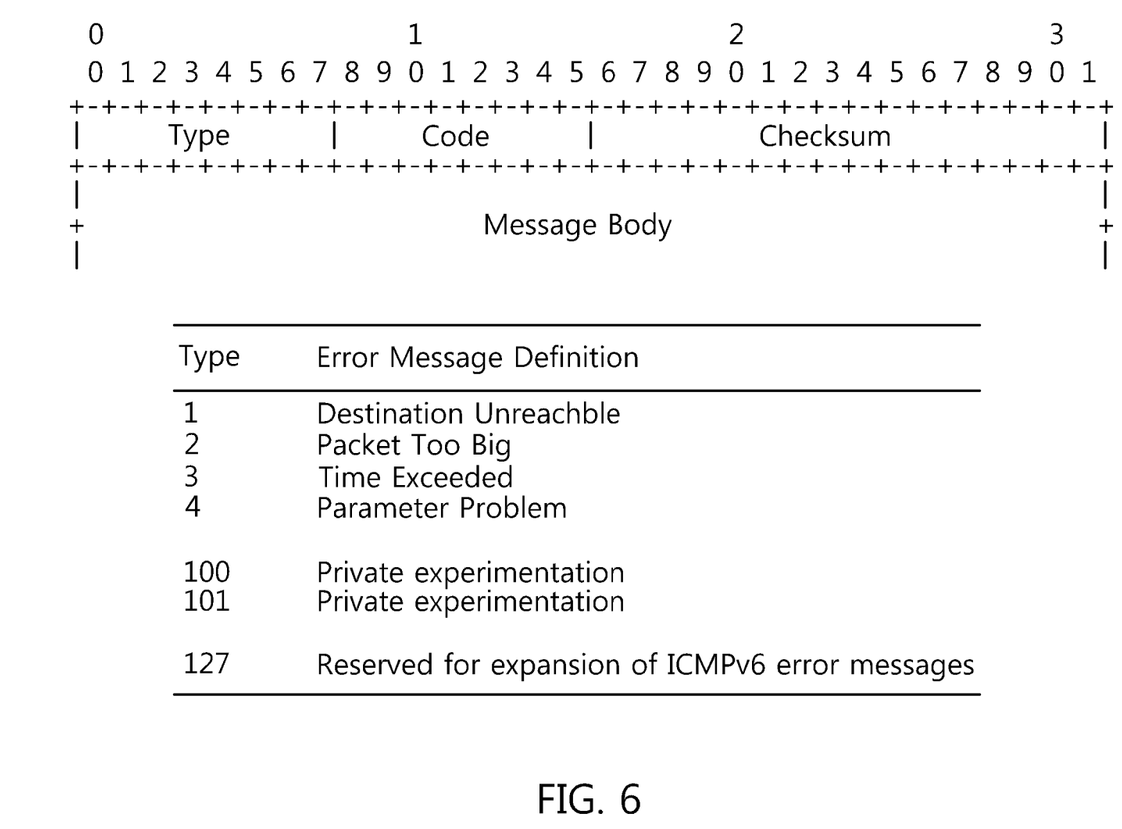
FIG. 6 illustrates the typical configuration of a message used in IP-based sleep mode control according to an embodiment of the present.

FIG. 6 illustrates the configuration of an Internet Control Message Protocol for IPv6 (ICMPv6) message as an example of a message used in IP-based sleep mode control according to an embodiment of the present invention. ICMPv6 stipulates that error messages and informational messages may be transmitted and that the types of errors may be identified by error types. Furthermore, for the extended application of ICMPv6, a user may newly define a code value and the details of an error and then use them.

Figure 7:
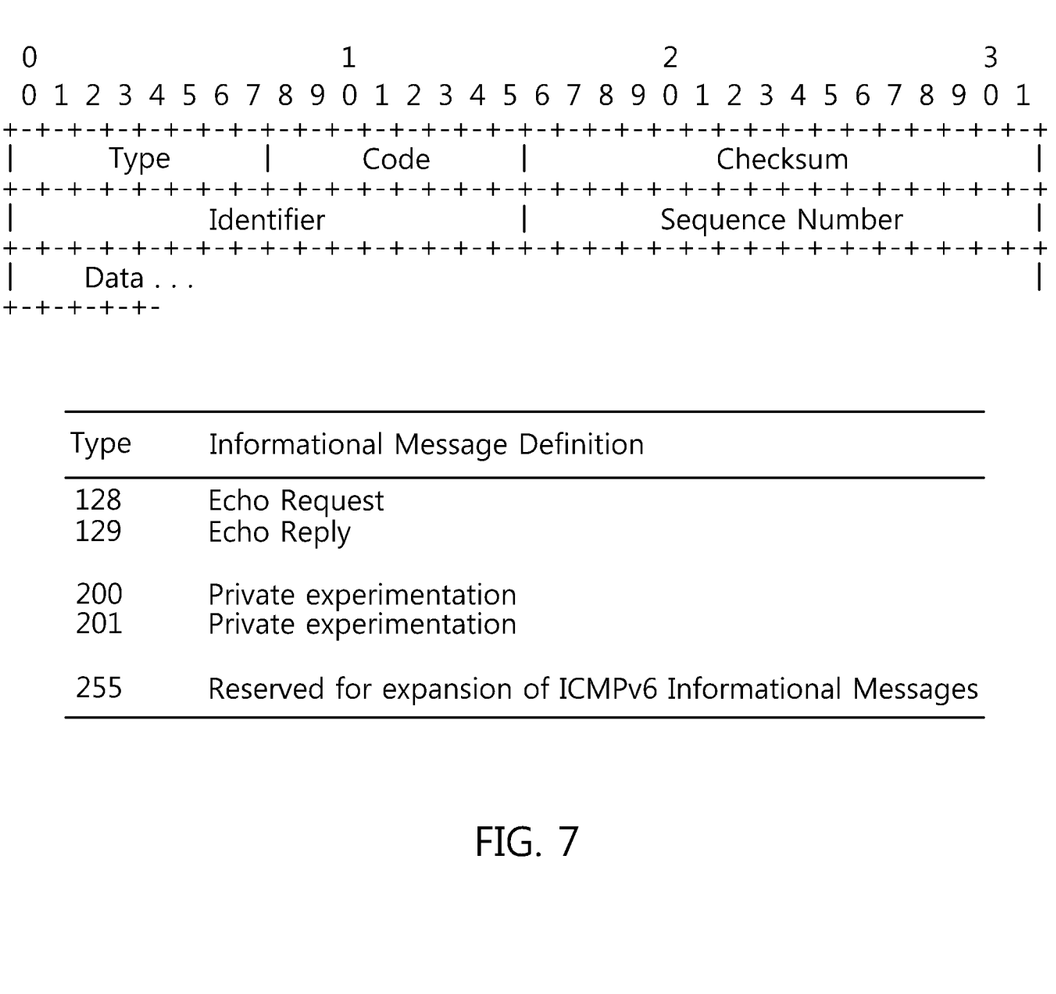
FIG. 7 illustrates an example of an informational message used in IP-based sleep mode control according to an embodiment of the present invention.

FIG. 7 illustrates an example of the configuration of an informational message used in IP-based sleep mode control according to an embodiment of the present invention. As in the case of the above-described error message, a user may newly define the type of ICMPv6 or a code value and use it for an extended application.

Figure 8:
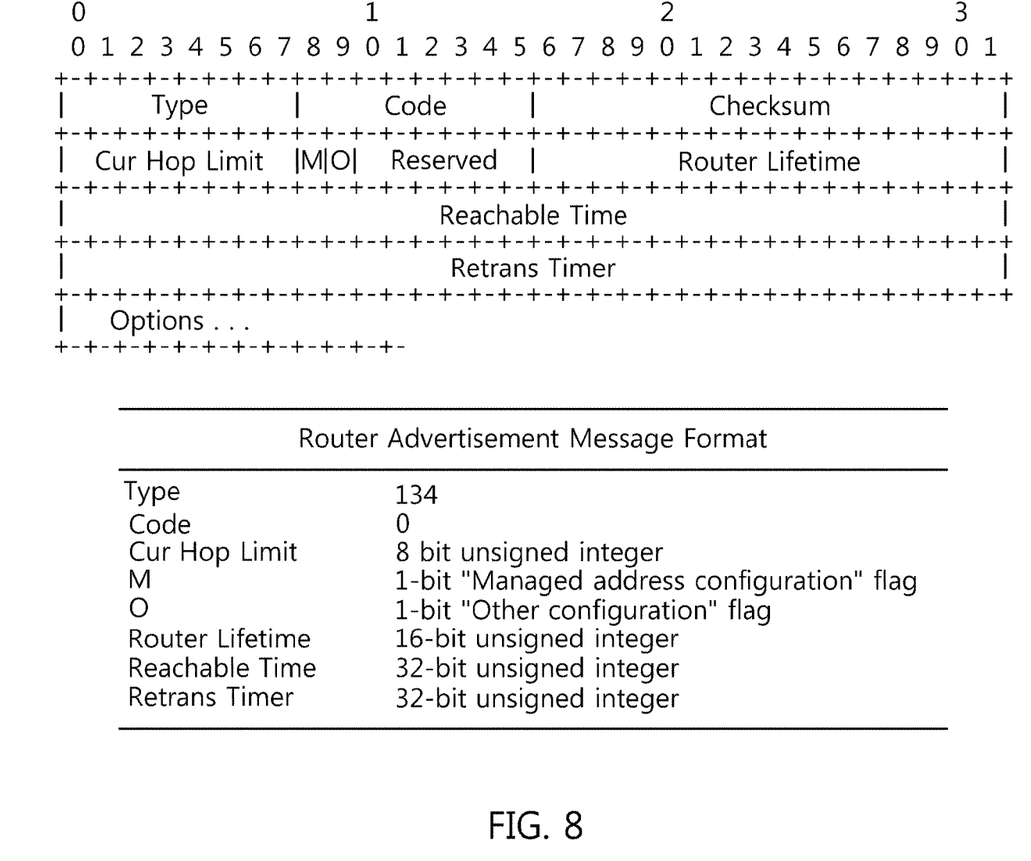
FIG. 8 illustrates an example of the configuration of a router advertisement (RA) message used in IP-based sleep mode control according to an embodiment of the present invention.

FIG. 8 illustrates an example of the configuration of a router advertisement (RA) message used in IP-based sleep mode control according to an embodiment of the present invention. The ICMPv6 RA message is stipulated as ICMPv6 type 134, and a message including time information may be transmitted between a router and a host.

IP-based sleep mode control methods according to embodiments of the present invention include, in a network including a sleep mode control network 100 including one or more internal hosts 101 to 10n and an internal router 110 responsible for the communication of the internal hosts 101 to 10n, and also including an external router 210 connected to the internal router 110 responsible for the communication of the sleep mode control network 100, and IP-based external hosts 201 to 20n connected via the external router 210:

a sleep mode control method in the case where a request for a sleep mode is made by any one of the internal hosts 101 to 10n;

a sleep mode control method in which the internal hosts 101 to 10n within the sleep mode control network 100 are collectively set to a sleep mode in response to a request from the internal router 110; and a method for processing a request for data communication from the external hosts 201 to 20n via the external router 210 with respect to the internal hosts 101 to 10n in a sleep mode based on the control.

Figure 9:
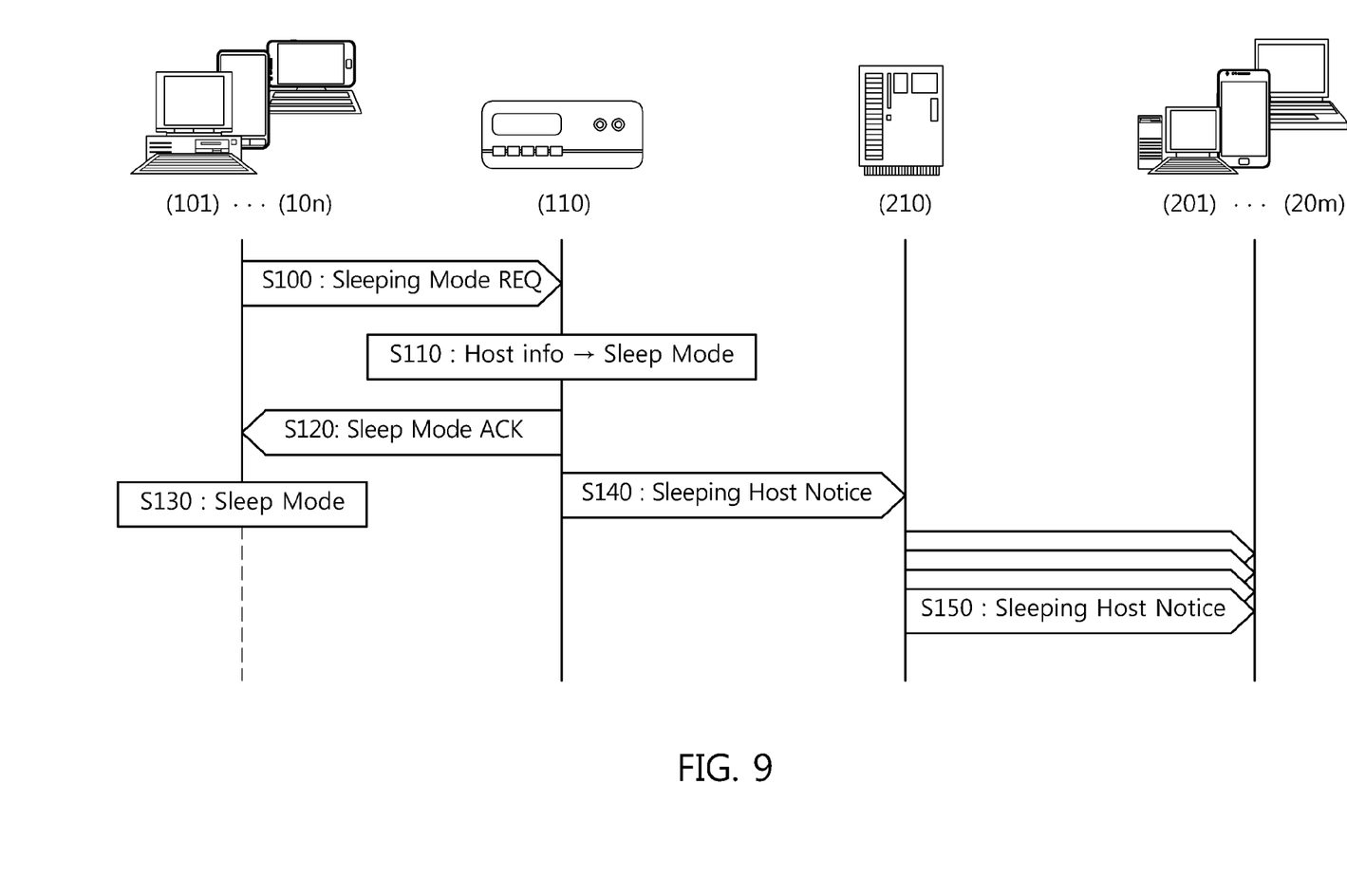
FIG. 9 illustrates a sleep mode control method in the case where a request for a sleep mode is made from any one of one or more internal hosts.

FIG. 9 illustrates a sleep mode control method in the case where a request for a sleep mode is made from any one of one or more internal hosts 101 to 10n in a network including a sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100, and IP-based external hosts 201 to 20n connected via the external router 210. This method may be applied to a case where a sleep mode is required because of the power state or communication environment of the internal hosts 101 to 10n.

First, in the sleep mode control network 100 according to this embodiment of the present invention, the internal hosts 101 to 10n and the internal router 110 for the communication of the hosts 101 to 10n exchange messages, for example, periodically or intermittently exchange counterpart information via ICMPv6, based on IP.

One of the internal hosts 101 to 10n that requires a sleep mode transmits sleep mode request information to the internal router 110 in the form of an ICMPv6 message at step S100.

The internal router 110 that has received the sleep mode request message from the internal host requiring a sleep mode updates the state of the corresponding host to a sleep mode at step S110.

Thereafter, the internal router 110 transmits a sleep mode ACK message to the internal host requiring a sleep mode at step S120.

The internal host that has received the sleep mode ACK message from the internal router 110 switches to a sleep mode at step S130.

Since the internal router 110 stores the history information of the external hosts 201 to 20n that communicated with the internal hosts in a sleep mode in a list form, the internal router 110 transmits information about the internal hosts in a sleep mode to the external hosts 201 to 20n of the history information list at steps S140 and S150.

Accordingly, the external hosts 201 to 20n that communicated with the internal hosts in a sleep mode may be aware of the internal hosts 101 to 10n in a sleep mode on the sleep mode control network 100.

At step S100 of transmitting the sleep mode request information to the internal router 110 in the form of an ICMPv6 message, the internal host requiring a sleep mode may transmit wake-up time information, together with the sleep mode request information.

Accordingly, at steps S140 and S150 of transmitting the information about the internal hosts in a sleep mode, the internal router 110 may provide the wake-up time information to the external hosts 201 to 20n of the history information list, thereby enabling external hosts 201 to 20n that communicated with the internal hosts in a sleep mode to make a communication re-attempt.

Figure 10:
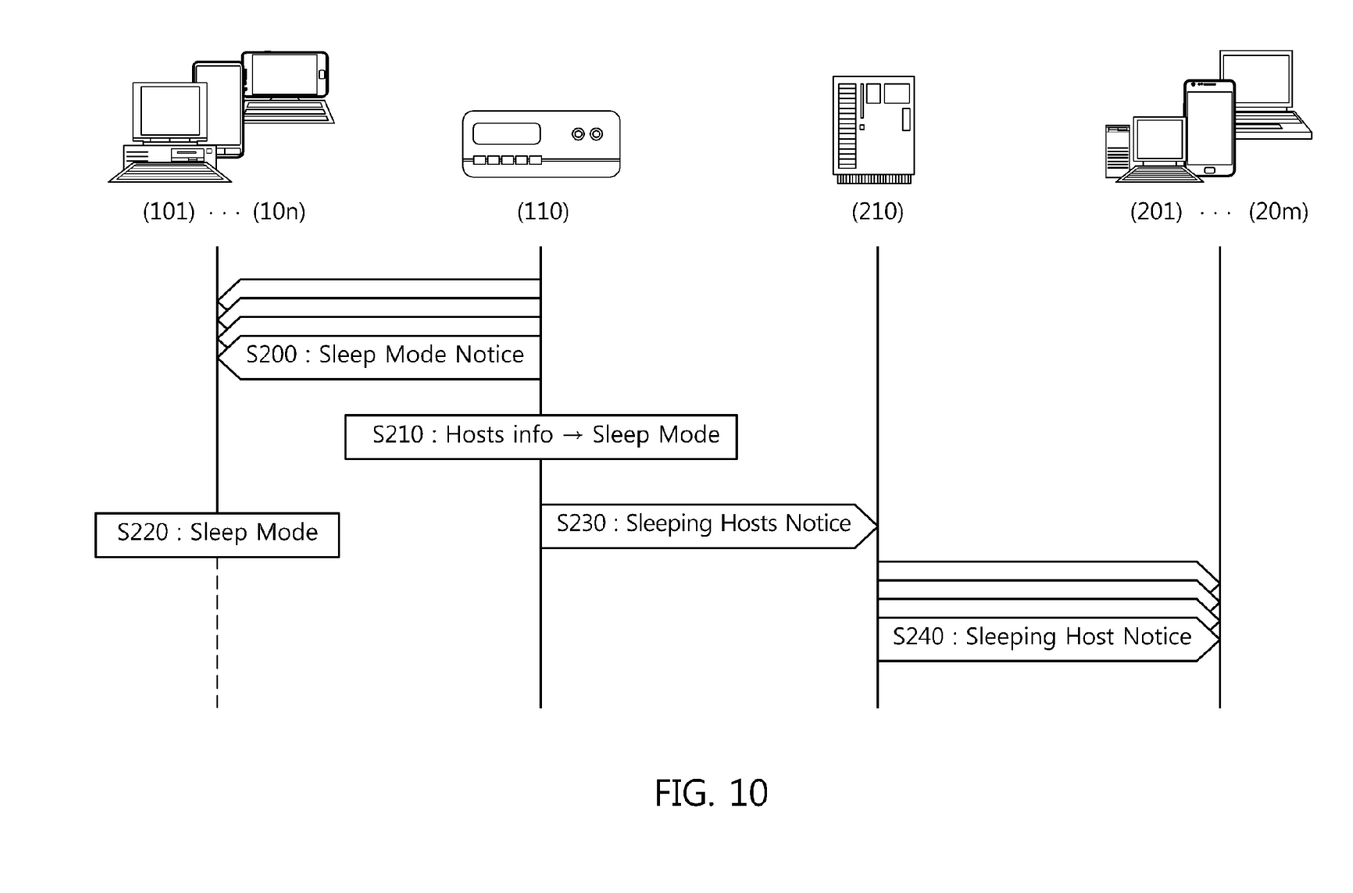
FIG. 10 illustrates a sleep mode control method in the case where a sleep mode is set from the internal router.

FIG. 10 illustrates a sleep mode control method in the case where a sleep mode is set from the internal router 110 in a network including a sleep mode control network 100 including internal hosts 101 to 10n and the internal router 110 responsible for the communication of the internal hosts 101 to 10n, and also including an external router 210 connected to the internal router 110 responsible for the communication of the sleep mode control network 100, and IP-based external hosts 201 to 20n connected via the external router 210. This method may be applied to the case where the internal router 110 requires a sleep mode because of the communication environment of the sleep mode control network 100, and may switch all the internal hosts 101 to 10n to a sleep mode.

When the sleep mode of the sleep mode control network 100 is required, the internal router 110 transmits information about the start and end times of a sleep mode to the internal hosts 101 to 10n in the form of a message at step S200.

The internal hosts that have received the sleep mode start and end time message from the internal router 110 switch to a sleep mode at step S130, and update the state of the internal hosts 101 to 10n to a sleep mode at step S210.

Since the internal router 110 stores the history information of the external hosts 201 to 20n that communicated with the internal hosts 101 to 10n in a sleep mode in the form of a list, the internal router 110 transmits information about the internal hosts in a sleep mode to the external hosts 201 to 20n of the history information list at steps S230 and S240.

Accordingly, the external hosts 201 to 20n that communicated with the internal hosts 101 to 10n in a sleep mode may be aware that the internal hosts 101 to 10n of the sleep mode control network 100 are in a sleep mode.

At steps S230 and S240 of transmitting information about the internal hosts in a sleep mode, the internal router 110 may further provide information about the end time of the sleep mode to the external hosts 200 to 20n of the history information list, thereby enabling the external hosts 201 to 20n that communicated with the internal hosts 101 to 10n in a sleep mode to make a communication re-attempt later.

Figure 11:
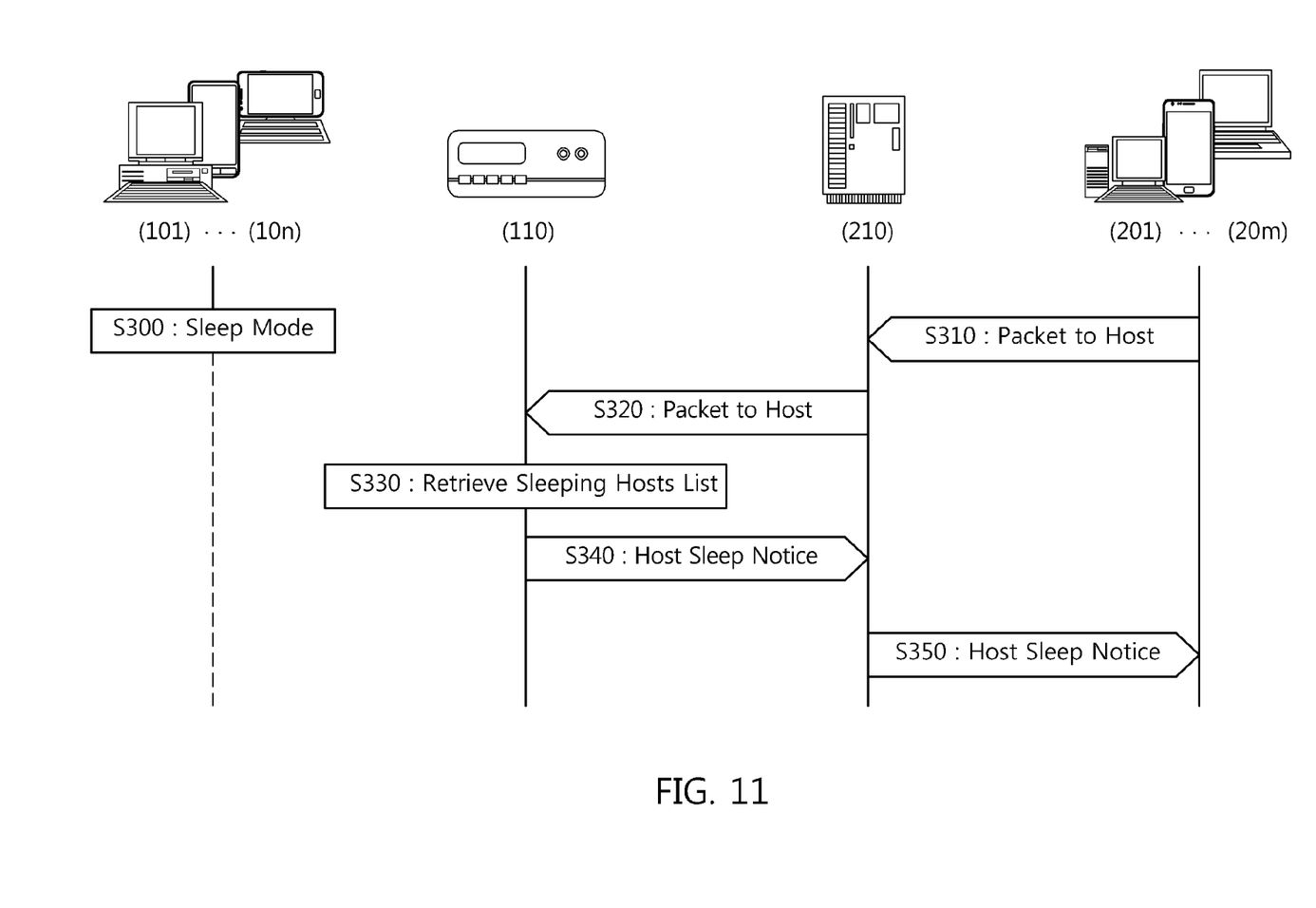
FIG. 11 illustrates a sleep mode control method in the case where a communication attempt is made from an external network in the state in which a network has been set to a sleep mode.

FIG. 11 illustrates a sleep mode control method in the case where a communication attempt is made from an external network in the state in which a network including a sleep mode control network 100 has been set to a sleep mode, the sleep mode control network 100 including the internal hosts 101 to 10n and an internal router 110 responsible for the communication of the internal hosts 101 to 10n, and also including an external router 210 connected to the internal router 110 responsible for the communication of the sleep mode control network 100, and IP-based external hosts 201 to 20n connected via the external router 210. This method may be applied to the case where the external hosts 201 to 20n that have not received the sleep state information of the internal hosts 101 to 10n of the sleep mode control network 100 make a communication request via the external router 210.

When a packet is transmitted to the internal router 110 from the external hosts 201 to 20n through the external router 210 at steps S310 and S320 with one or more internal hosts 101 to 10n set to a sleep mode on the sleep mode control network 100 at step S300, the internal router 110 refers to a list of internal hosts 101 to 10n currently in a sleep mode within the sleep mode control network 100 at step S330.

If the destination host of the packet is in a sleep mode, the internal router 110 transmits a message indicative that the destination host is in a sleep mode to the external hosts 201 to 20n that have transmitted the packet via the external router 210 at steps S340 and S350. In this case, the message may be configured such that the sleep mode of the destination host is identified by selecting the error code value of the error message "destination unreachable" described in FIG. 6.

In this case, the sleep mode of the destination host may be identified by selecting the error code value of the error message "destination unreachable" described in FIG. 6.

At steps S340 and S350 of transmitting a message indicative that the destination host is in a sleep mode, when the sleep mode end time information of the destination host of the packet is provided to the internal router 110, the internal router 110 may transmit a message including the sleep mode end time information to the external hosts 201 to 20n, thereby enabling the external hosts 201 to 20n to make a communication re-attempt.

At steps S340 and S350 of transmitting the message indicative that the destination host is in a sleep mode, the external host that has received the message including the sleep mode end time information of the destination host may transfer the sleep mode end time information of the destination host from a network layer to a transport layer and an application layer using a cross layer method, thereby enabling a communication re-attempt to be made later.

The above-described IP-based sleep mode control method according to at least one embodiment of the present invention is advantageous in that: it provides a sleep mode control method in the case where a request for a sleep mode is made from any one of the internal hosts 101 to 10n; it enables the internal hosts 101 to 10n within the sleep mode control network 100 to be collectively set to a sleep mode in response to a request from the internal router 110 and; and it efficiently deals with a communication request via the external router 210 from the external hosts 201 to 20n that have not received information about the sleep state of the internal hosts 101 to 10n of the sleep mode control network 101.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method comprising:

when a request for a sleep mode is made from any one of the internal hosts:

transmitting, by one of the internal hosts requiring a sleep mode, a sleep mode request message to the internal router;

updating, by the internal router having received the sleep mode request message from the internal host requiring a sleep mode, a state of the corresponding host to a sleep mode;

transmitting, by the internal router, a sleep mode ACK message to the internal host requiring a sleep mode;

switching, by the internal host having received the sleep mode ACK message from the internal router, to a sleep mode; and transmitting, by the internal router, information about the internal hosts in a sleep mode to external hosts of a history information list because the internal router stores history information of the external hosts that communicated with the internal hosts in a sleep mode in a list form.

2. The method of claim 1, wherein transmitting the sleep mode request message to the internal router comprises transmitting, by the internal host requiring a sleep mode, wake-up time information, together with the sleep mode request message.

3. The method of claim 1, wherein transmitting the information about the internal hosts in a sleep mode comprises providing, by the internal router, wake-up time information to the external hosts of the history information list, thereby enabling external hosts that communicated with the internal hosts in a sleep mode to make a communication re-attempt.

4. A method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method comprising:
when a sleep mode is required from the internal router:
transmitting, by the internal router, a sleep mode start and end time message indicative of start and end times of a sleep mode to the internal hosts;
switching, by the internal hosts having received the sleep mode start and end time message from the internal router, to a sleep mode, and updating, by the internal hosts having received the sleep mode start and end time message from the internal router, a state of the internal hosts to a sleep mode; and
transmitting, by the internal router, information about the internal hosts in a sleep mode to the external hosts of a history information list because the internal router stores the history information of the external hosts that communicated with the internal hosts in a sleep mode in a list form.

5. The method of claim 4, wherein transmitting the information about the internal hosts in a sleep mode comprises further providing, by the internal router, information about an end time of the sleep mode to the external hosts of the history information list, thereby enabling the external hosts that communicated with the internal hosts in a sleep mode to make a communication re-attempt later.

6. A method for Internet Protocol (IP)-based sleep mode control in a network including a sleep mode control network including one or more internal hosts and an internal router responsible for communication of the internal hosts, and also including an external router connected to the internal router responsible for the communication of the sleep mode control network, and IP-based external hosts connected via the external router, the method comprising:
when a communication attempt is made from an external network with the network set to a sleep mode:
transmitting a packet to the internal router from the external hosts through the external router with one or more internal hosts set to a sleep mode on the sleep mode control network;
referring, by the internal router, to a list of internal hosts currently in a sleep mode within the sleep mode control network; and
when a destination host of the packet is in a sleep mode, transmitting a message indicative that the destination host is in a sleep mode to the external hosts that have transmitted the packet via the external router.

7. The method of claim 6, wherein transmitting the message indicative that the destination host is in a sleep mode comprises, when sleep mode end time information of the destination host of the packet is provided to the internal router, transmitting, by the internal router, a message including the sleep mode end time information to the external hosts, thereby enabling the external hosts to make a communication re-attempt.

8. The method of claim 6, wherein transmitting the message indicative that the destination host is in a sleep mode comprises transferring, by the external host having received the message including the sleep mode end time information of the destination host, the sleep mode end time information of the destination host from a network layer to a transport layer and an application layer using a cross layer method, thereby enabling a communication re-attempt to be made later.

* * * * *